Patented Oct. 22, 1946

2,409,675

UNITED STATES PATENT OFFICE 2,409,675

PREPARATION OF POLYAMINOACETALS

William Franklin Gresham, Wilmington, Del., assignor to E. I. du Pont de Nemours & Company, Wilmington, Del., a corporation of Delaware No Drawing. Original application February 14, 1942, Serial No. 430,945. Divided and this application December 26, 1944, Serial No. 569,915

5 Claims. (Cl. 260—584)

This invention relates to polyaminoacetals, to processes for their preparation, and especially to their preparation from acetals and cyanohydrins and more particularly from formals and cyanohydrins. The application is a division of my copending application S. N. 430,945 filed February 14, 1942.

The over-all process of the invention includes three steps. In the first step, cyanoacetals are prepared by the reaction of an acetal of an aldehyde and/or a ketone with a cyanohydrin of an aldehyde and/or a ketone in the presence of a suitable acidic type catalyst. In the second step, the cyanoacetal of the first step is hydrogenated to give the corresponding aminoacetal and in the third step of the process the aminoacetal is converted to a salt and the resulting salt treated to liberate the polyaminoacetal by disproportionation.

An object of the invention is to provide new chemical compounds, viz. di(aminoalkyl) acetals. Another object of the invention is to provide a process for the preparation of di(aminoalkyl) acetals. Still another object is to provide a three-step process for the preparation of di(aminoalkyl) acetals and ketals together with reaction conditions therefor. Other objects and advantages of the invention will hereinafter appear.

In the first step of the process acetals of aldehydes or ketones are reacted with cyanohydrins of aldehydes and ketones. This reaction is effected by mixing the acetal and cyanohydrin in the presence of a suitable acidic type catalyst such, for example, as sulfuric acid, hydrochloric acid, phosphoric acid, boron fluoride (or its addition products), paratoluene sulfonic acid or the like and heating the resulting mixture to a temperature from room temperature to approximately 300° C. In many instances, however, no heating is necessary as the reaction proceeds at room temperatures down to in the neighborhood of 0° C. Pressures may be employed if desired ranging from atmospheric to 100 atmospheres or more, although for normal operation pressures above atmospheric are not necessary. In order to force the reaction to completion, it is preferable to remove from the reaction zone the alcohol produced. This may be done continuously or intermittently as desired. Subsequent to the reaction the catalyst is preferably neutralized with a base either organic or inorganic such as, for example, sodium hydroxide, sodium carbonate, sodium methoxide, pyridine, or the like and the products distilled for the recovery of the cyanonitrile produced.

Generically the reaction may be illustrated as proceeding in accord with the equation:

1. 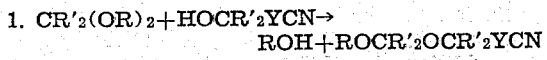

in which R is an alkyl or substituted alkyl group, R' is hydrogen, an alkyl or substituted alkyl group, and Y is a single bond or an alkyl group; the alcohol being removed by distillation as formed. More specifically the reaction may be illustrated by the preparation of (methoxymethoxy) acetonitrile in accord with the equation:

2. 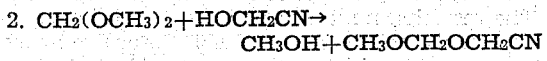

While the reaction proceeds primarily between one mole of the acetal and one mole of the cyanohydrin, nevertheless, a reaction likewise takes place between one mole of the acetal and two moles of the cyanohydrin to give two moles of alcohol and one mole of a dinitrile.

The invention provides a method for the preparation of cyanoacetals by the interaction of the cyanohydrins and their equivalents listed in the following paragraph with the acetals and their equivalents listed herewith. As examples of suitable acetals may be designated the symmetrical acetals which may be prepared by reacting formaldehyde or a higher aldehyde such as acetaldehyde, propionaldehyde, normal and isobutyraldehyde with an alcohol, such, for example, as methanol, ethanol, normal and isopropanol, normal and isobutanol and the higher alcohols such as nonyl, decyl, cyclohexyl and like straight and branched chained alcohols. The above acetals are primarily of the symmetrical type, unsymmetrical acetals, however, may likewise be employed such, for example, as methyl ethyl formal, (methoxymethoxy) ethanol, methyl ethyl acetal, methyl propyl formal, ethyl propyl formal, methyl propyl acetal, and the like. Acetals of the type made from ketones and alcohols, sometimes called ketals, may likewise be used and as examples of these compounds which may be employed are those prepared by the interaction of ketones such as acetone, methyl ethyl ketone, diethyl ketone, and the higher symmetrical and unsymmetrical ketones with the alcohols designated above, the cyclic formals and their polymers likewise may be used such, for example, as 1,3-dioxolane, polymeric 1,3-dioxolane, glycol formals, 1,3-dioxane and their substitution products.

The above designated acetals may be reacted with such cyanohydrins and their equivalents, as, for example, those prepared by the interaction of hydrocyanic acid with the aldehydes generally, such as formaldehyde, acetaldehyde, propionaldehyde, normal and isobutyraldehyde and the higher aldehydes. Ketone cyanohydrins are likewise suitable and as examples of these compounds may be designated those prepared by the interaction of hydrocyanic acid with acetone, methyl ethyl ketone, diethyl ketone, cyclohexanone, and the higher symmetrical and unsymmetrical ketones. Hydroxy acid nitriles which may be called glycol cyanohydrins may also be used such, for example, as ethylene glycol cyanohydrin, $HOCH_2CH_2CN$, propylene glycol cyanohydrin, $HOCH_2CH_2CH_2CN$, and so forth.

The more detailed practice of this step of the invention is illustrated by the following examples in which parts are by weight unless otherwise stated.

*Example 1.*—A mixture consisting of 228 parts of formaldehyde cyanohydrin, 1648 parts of methylal (as a methanol azeotrope containing 8% methanol and 92% methylal) and 10 parts of sulfuric acid was boiled five hours. Catalyst was neutralized, as indicated by phenolphthalein, by the addition of $NaOHC_3$ and the product was distilled. 110 parts of the product (methoxy-methoxy) acetonitrile $CH_3OCH_2OCH_2CN$, a colorless, mobile liquid with a B. P. 66° C./23 mm. was obtained.

*Example 2.*—Two moles of isobutyraldehyde cyanohydrin was reacted with 3 moles of isobutyl formal in the presence of 0.1 mole of sulfuric acid. The resulting mixture was heated to a temperature in the neighborhood of 100° C. for five hours, subsequent to which sodium methoxide was added to neutralize the catalyst and until the solution was neutral as indicated by phenolphthalein. An 81.4% conversion of alpha (isobutoxymethoxy) isovaleronitrile

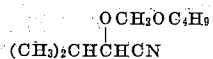

was obtained. It is a white, water-immiscible oil, boiling point 67° C. at 2 mm.

*Example 3.*—A reaction mixture consisting of 114 parts of formaldehyde cyanohydrin, 320 parts of diisobutyl formal and 2 parts of sulfuric acid was fractionated until no more isobutanol distilled from the mixture. After neutralizing the mixture with sodium hydroxide, using litmus as the indicator, fractionation was continued. The (isobutoxymethoxy) acetonitrile fraction, obtained in 83.3% yield, boiled at 50° at 3 mm.

*Example 4.*—A reaction mixture consisting of 114 parts of formaldehyde cyanohydrin, 320 parts of diisobutyl formal and 2 parts of sulfuric acid was fractionated until no more isobutanol distilled from the mixture. After neutralizing the mixture with sodium hydroxide, using litmus as the indicator, fractionation was continued. The (cyanomethoxymethoxy) acetonitrile fraction obtained in 10% yield, boiled at 110° at 2 mm.

*Example 5.*—A reaction mixture consisting of 228 parts of formaldehyde cyanohydrin, 541 parts of diethyl formal and 2 parts of sulfuric acid was fractionated until the binary of diethyl formal and ethanol stopped distilling from the mixture. After neutralizing the mixture, as described above, fractionation was continued. The ethoxymethoxy acetonitrile fraction, obtained in 57.0% yield, boiled at 45° at 1 mm.

*Example 6.*—A reaction mixture consisting of 142 parts of formaldehyde cyanohydrin, 277 parts of di(methoxyethyl) formal and 2 parts of sulfuric acid was fractionated until methoxy ethanol stopped distilling from the mixture. After neutralizing the mixture, as described above, fractionation was continued. The (methoxyethoxymethoxy) acetonitrile fraction, obtained in 67% yield, boiled at 70° at 3 mm.

*Example 7.*—A mixture of diisobutyl formal (1 mol), acetaldehyde cyanohydrin (1 mol), and sulfuric acid (2 cc.) was heated on an oil bath and the isobutanol formed in the reaction was tilled from the mixture at reduced pressure (55 mm.) during the reaction. After a 6 hour reaction period the product, alpha (isobutoxymethoxy) propionitrile, was washed with water and distilled at 3 mm.

*Example 8.*—Acetaldehyde cyanohydrin was heated to a temperature between 60 and 90° C. with excess methylal and sulfuric acid catalyst in a pressure still operating under 30# gauge pressure. Methylal and methanol were distilled from the reaction mixture during the reaction at 77° C. at this pressure. The pressure was released and the mixture neutralized as described above and after distillation a conversion of 45% to methoxymethoxy-propionitrile was realized.

The above valuable nitriles can be readily converted to amines by hydrogenation. This may be effected preferably in the liquid phase employing a suitable active hydrogenation catalyst such, for example, as a nickel, cobalt, fused copper-cobalt, copper chromite catalyst or the like. The hydrogenation can be conducted in the liquid or vapor phase at temperatures ranging between 25 and 200° C. and at pressures between 1 and 1000 atmospheres although it is preferred to conduct the hydrogenation of these nitriles at temperatures between 75 and 150° C. and under pressures between 200 and 700 atmospheres.

It has likewise been found that polyamine formation during hydrogenation is inhibited, yields are increased, and the reaction goes more smoothly if there be present during the reaction from 1 to 20 moles of ammonia per mole of the nitrile. If desired, the nitrile to be hydrogenated may be dissolved in aqueous ammonia or the nitrile may be dissolved in a suitable solvent such, for example, as methanol, di(isopropyl) ether, dioxane, or 1,3-dioxolane, which is not decomposed or hydrogenated during the reaction or decomposed by the ammonia added to the solution.

This step of the process may be illustrated by the following equation:

4. 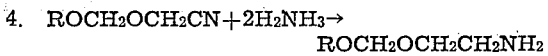

which illustrates the hydrogenation of an (alkoxymethoxy) acetonitrile to an (alkoxymethoxy) ethyl amine. In accord with this process the other nitriles described and illustrated under step 1 of the process may be similarly converted to the corresponding amine.

In order to illustrate this step of the process, several specific embodiments of the invention are described herewith by way of example.

*Example 9.*—A reaction mixture consisting of 78.3 parts of (isobutoxymethoxy) acetonitrile, 100 parts of ammonia, and 20 parts of an active nickel hydrogenation catalyst supported on kieselguhr was subjected to the action of hydrogen at 100° C. and 700 atmospheres pressure for 1.5 hours. After removing catalyst the product was distilled. Isobutyl aminoethyl formal,

(B. P. 50° C./4 mm.) was obtained in 91.5% yield.

*Example 10.*—A reaction mixture consisting of 50 parts of (isobutoxymethoxy) acetonitrile, 100 parts of diisopropyl ether, 20 parts of an active nickel hydrogenation catalyst (prepared as in Example 9) and 50 parts of ammonia was subjected to the action of hydrogen at 100° C. and 700 atmospheres pressure for one hour. After removing the catalyst the product was distilled. Isobutyl aminoethyl formal was obtained in 79.9% yield.

*Example 11.*—One mole of (methoxymethoxy) acetonitrile dissolved in 12 moles of ammonium hydroxide containing 10% nickel catalyst was subjected to the action of hydrogen at 100° C. and 700 atmospheres pressure until the reaction was complete. The catalyst was removed and the product distilled. Methyl aminoethyl formal, $CH_3OCH_2OCH_2CH_2NH_2$ was obtained in a practically quantitative yield as a colorless, mobile liquid (B. P. 56–57° C./30 mm.).

Similarly methoxyethyl aminoethyl formal can be made from (methoxyethoxymethoxy) acetonitrile; isobutyl 1-amino-3-methyl-2-butyl formal from (isobutoxymethoxy) isovaleronitrile; and methyl 1-amino-2-methyl-ethyl formal from (methoxymethoxy) propionitrile.

It has likewise been found that the amines, prepared in accord with step 2 by hydrogenation in the presence of ammonia of the nitriles prepared in accord with the process of step 1, can be converted into salts and by disproportionation these salts converted to polyaminoacetals.

The salts may be prepared, for example, by adding to the aminoacetals an organic or inorganic acid such, for example, as hydrochloric acid, sulfuric acid, phosphoric acid, acetic acid, glycolic acid, oxalic acid or other suitable organic or inorganic acid, the addition preferably being carried out at a temperature between 0 and 100° C. The salt thus prepared is then reacted with a suitable base such as the alkali metal or alkaline earth metal hydroxide, carbonate, or alkoxide or an organic base such as pyridine, and after filtering off the precipitated salt, if present, the aminoacetal is distilled from the filtrate.

This step of the process may be illustrated by the following equations:

5. $ROCR'_2OCR'_2YNH_2 + HX \rightarrow$
   $ROCR'_2OCR'_2YNH_2 \cdot HX$

6. $2ROCR'_2OCR'_2YNH_2 + HX \rightarrow ROCR'_2OR +$
   $HX \cdot H_2NYCR'_2OCR'_2OCR'_2YNH_2 \cdot HX$ in which R is an alkyl or substituted alkyl group, R' is hydrogen, an alkyl or substituted alkyl group, Y is a single bond or an alkyl group and X is the anion of a mineral acid.

More specifically this step of the process may be illustrated by the equations:

7. $ROCH_2OCH_2CH_2NH_2 + HCl \rightarrow$
   $ROCH_2OCH_2CH_2NH_2HCl$

8. $2ROCH_2OCH_2CH_2NH_2 + HCl \rightarrow ROCH_2OR +$
   $HCl \cdot H_2NCH_2CH_2OCH_2OCH_2CH_2NH_2 \cdot HCl$ Equation 7 illustrates the conversion of an (alkoxy-methoxy) ethyl amine to its hydrochloride and Equation 8 illustrates the disproportionation of the hydrochloride to a poly salt. The disproportionation results when excess acid over that used to make the salt is added. Subsequent treatment of the polyhydrochloride by an equivalent quantity of a base, filtering to remove the chloride salt and fractionally distilling the filtrate will give the corresponding di(ethylamine) formal, $CH_2(OCH_2CH_2NH_2)_2$. If desired, the salts may be treated in a suitable solvent, such as methanol, ethanol, or 1,4-dioxane, with ammonia to precipitate the ammonium salt with liberation of the amine acetal. In a similar manner the other products of steps 1 and 2 as well as other aminoacetals may be converted to diamines.

In order to illustrate the third step of the process several specific embodiments of the invention are given. The invention, however, is not to be restricted by these or the other examples given.

*Example 12.*—To 73.5 parts of isobutyl aminoethyl formal, $C_4H_9OCH_2OCH_2CH_2NH_2$, was added 20 parts of dry HCl gas with cooling by means of an external ice bath. After the addition the mixture consisted of a white solid suspended in a mobile liquid. Di-isobutyl formal was removed from the reaction mixture at 2 mm. pressure. To the solid remaining 110 parts of 29.6% $NaOCH_3$ in $CH_3OH$ was added and NaCl then filtered off. The product was distilled and di(aminoethyl) formal $(NH_2CH_2CH_2O)_2CH_2$, B. P. 70° C./2 mm. obtained in a yield of 90% or better.

*Example 13.*—58.8 parts of isobutyl aminoethyl formal was placed in a suitable container, cooled, agitated and 20 parts of anhydrous hydrochloric acid was introduced. As a result of this reaction diisobutyl formal was produced and withdrawn by distillation under reduced pressure leaving the salt of the diamine as a white solid. The salt was converted to the free base by neutralization to phenolphthalein by the addition of sodium methoxide. The precipitated sodium chloride was filtered off and the filtrate fractionally distilled to give di(aminoethyl) formal, obtained in a 90% yield.

*Example 14.*—The process of Example 13 was repeated using 212 parts of ethyl aminoethyl formal, $C_2H_5OCH_2OCH_2CH_2NH_2$, and 65 parts of hydrochloric acid. Di(aminoethyl) formal was obtained in a yield of substantially 90%.

*Example 15.*—20 parts of di(aminoethyl) formal hydrochloride dissolved in 60 parts of isobutanol is saturated with anhydrous ammonia and the ammonium chloride formed rapidly precipitates. The solution was filtered and the di-(ethylamino) formal separated by distillation.

Similarly di(aminoethyl) formal can be obtained from methyl aminoethyl formal, $CH_3OCH_2OCH_2CH_2NH_2$ methoxyethyl aminoethyl formal, $CH_3OCH_2CH_2OCH_2OCH_2CH_2NH_2$ and from like products. Those skilled in the art will appreciate that other aminoalkyl formals and acetals can be obtained from corresponding monoamine alkyl formals and acetals to give products having the formula:

$H_2NCH_2CR'_2OCR'_2OCR'_2CH_2NH_2$ in which R' is hydrogen, an alkyl or substituted alkyl group.

The products of the invention have a wide variety of uses. The diamines may be reacted with dibasic acids, such as adipic acid, to form salts from which linear polymers of great utility may be produced and in addition to being useful in the preparation of the diamines the intermediates are useful as plasticizers, softeners, thickeners, nonpolar detergents, softeners, and plasticizers for regenerated cellulose, cellulose ethers, esters, and the like.

I claim:

1. A process for the preparation of a di(aminoalkyl) acetal which comprises heating an acetal with aldehyde cyanohydrin whereby an unsymmetrical cyanoalkyl acetal is obtained, heating the resulting cyanoalkyl acetal with hydrogen in the presence of ammonia and a hydrogenation catalyst to form an unsymmetrical aminoalkyl acetal, separating the unsymmetrical aminoalkyl acetal from the hydrogenated reaction mixture, subjecting the separated unsymmetrical aminoalkyl acetal to a reaction with an excess of an inorganic acid, neutralizing the salt obtained with a base, and subsequently removing from the resulting mixture after filtration the di(aminoalkyl) acetal.

2. A process for the preparation of a di(aminoalkyl) formal which comprises heating a formal with formaldehyde cyanohydrin whereby an unsymmetrical cyanoalkyl formal is obtained, heating the resulting cyanoalkyl formal with hydrogen in the presence of ammonia and a hydrogenation catalyst to form an unsymmetrical aminoalkyl formal, with hydrogen in the presence of ammonia and a hydrogenation catalyst to form an unsymmetrical aminoalkyl formal, separating the unsymmetrical aminoalkyl acetal from the hydrogenated reaction mixture, subjecting the separated unsymmetrical aminoalkyl formal to a reaction with an excess of an inorganic acid, neutralizing the salt obtained with a base, and subsequently removing from the resulting mixture after filtration the di(aminoalkyl) formal.

3. A process for the preparation of di(aminoethyl) formal which comprises producing methoxymethoxy) acetonitrile by heating methylal with formaldehyde cyanohydrin, producing methyl aminoethyl formal by subjecting (methoxymethoxy) acetonitrile to a reaction with hydrogen at a temperature between 25° and 200° C. in the presence of ammonia and a hydrogenation catalyst, separating the methyl aminoethyl formal from the hydrogenation mixture, subjecting the methyl aminoethyl formal to a reaction with an excess of an inorganic acid, neutralizing the resulting salt with a base and after filtering, and recovering di(aminoethyl) formal from the reaction mixture by distillation.

4. In a process for the preparation of di(aminoethyl) formal the steps which comprise subjecting isobutyl aminoethyl formal to a reaction with an inorganic acid and thereby forming a mono salt of the formal, subjecting said mono salt to a reaction with an additional quantity of a mineral acid to form a di(aminoethyl) formal salt, neutralizing the latter salt with a base and recovering the di(aminoethyl) formal from the reaction mixture by distillation.

5. In a process for the preparation of di(aminoethyl) formal the steps which comprise adding approximately 20 parts of dry hydrochloric acid gas with cooling to approximately 73½ parts of isobutyl aminoethyl formal, separating the precipitated salt by filtration, adding approximately 110 parts of a 29.6% sodium methoxide solution in methanol, filtering off the sodium chloride and recovering the di(aminoethyl) formal.

WILLIAM FRANKLIN GRESHAM.